Patented Dec. 25, 1928.

1,696,499

UNITED STATES PATENT OFFICE.

WALTER MIEG AND ALBERT JOB, OF ELBERFELD, GERMANY, ASSIGNORS TO GRASSELLI DYESTUFF CORPORATION, OF NEW YORK, N. Y., A CORPORATION OF DELAWARE.

MONO-AMINO-DIPHTHALOYL ACRIDONES AND PROCESS OF PREPARING THE SAME.

No Drawing. Application filed May 23, 1927, Serial No. 193,721, and in Germany May 27, 1926.

The present invention relates to mono-amino-diphthaloyl-acridones of the general formula:

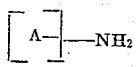

in which A represents a diphthaloyl-acridone, for instance 3.4.5.6-diphthaloyl-acridone of the probable formula:

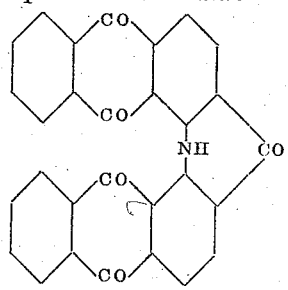

or 1.2.5.6-diphthaloyl-acridone of the probable formula:

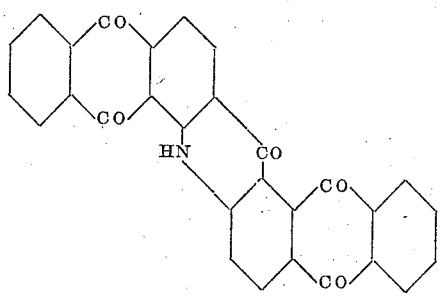

The position of the amino group is not definitely known.

Our new compounds can be produced, for instance, by reducing the mono-nitro-diphthaloyl-acridones obtainable according to the process described in our co-pending application Ser. No. 193,723, by causing diphthaloyl-acridones to be reacted upon by nitrating agents.

The reduction is easily performed, for example, by means of aqueous sodium hydrosulfite solution, most advantageously in the presence of a small quantity of alcohol. Besides, no isolation of the amino compound is necessary. One can make the reduction directly during the dyeing process; that is to say, the corresponding nitro compound is dissolved in a dye bath containing alkaline hydrosulfite. At the first moment a vat of reddish to brownish colors is obtained, which changes very quickly into a violet vat and the amino compound is thereafter dyed on the fibre in greyish-blue shades.

In this way, for example, the nitro compounds of 3.4.5.6-diphthaloyl acridone and 1.2.5.6-diphthaloyl acridone can be easily transformed into their corresponding mono amino compounds.

The isolated mono-amino compound of the 3.4.5.6-diphthaloyl acridone is in dry state a dark-blue powder. The hydrosulfite vat is brownish red. From this vat the fibre is dyed in greyish-blue shades. The mono-amino compound is soluble in organic solutions, as for instance, aniline and nitro benzole, and crystallizes from these solutions into blue needles, soluble in concentrated sulfuric acid with yellowish brown shades.

The mono-amino compound of 1.2.5.6-diphthaloyl acridone is in dry state a dark blue powder. The hydrosulfite vat is violet. It dyes the fibre greyish-blue shades. It is soluble in organic solutions, as for instance, aniline and nitro benzole, and crystallizes from these solutions in bluish needles, soluble in concentrated sulfuric acid with yellowish shades.

We claim:

1. As new vat dyestuffs mono amino diphthaloyl acridones obtainable by reducing the corresponding mono nitro diphthaloyl acridone, being in dry state dark blue powders and dyeing from a hydrosulfite vat greyish-blue shades, soluble in concentrated sulfuric acid with yellow to yellowish brown shades.

2. As a new vat dyestuff the mono amino 1.2.5.6-diphthaloyl acridone obtainable by reducing the corresponding mono nitro 1.2.5.6-diphthaloyl acridone, being in dry state a dark blue powder, dyeing on the fibres from a violet hydrosulfite bath in greyish-blue shades, difficultly soluble in aniline and nitro benzole and soluble in concentrated sulfuric acid with yellow shades.

3. Materials dyed with the products described in claim 1.

4. Materials dyed with the product described in claim 2.

In testimony whereof, we affix our signatures.

WALTER MIEG.
ALBERT JOB.